United States Patent

Shaffer

[11] 3,923,629
[45] Dec. 2, 1975

[54] ELECTROLYTIC CELL FOR INACTIVATION AND DESTRUCTION OF PATHOGENIC MATERIAL

[75] Inventor: Peter T. B. Shaffer, Grand Island, N.Y.

[73] Assignee: The Carborundum Company, Niagara Falls, N.Y.

[22] Filed: Mar. 25, 1974

[21] Appl. No.: 454,637

[52] U.S. Cl. .............. 204/260; 204/149; 204/272; 204/301
[51] Int. Cl.² .................. C02B 1/82; C02C 5/12
[58] Field of Search .......... 204/149, 151, 205, 283, 204/301, 272, 260

[56] References Cited
UNITED STATES PATENTS

| | | | |
|---|---|---|---|
| 1,603,298 | 10/1926 | Speed | 204/151 X |
| 2,928,783 | 3/1960 | Bacon | 204/283 |
| 3,022,244 | 2/1962 | La Blanc et al. | 204/283 X |
| 3,168,458 | 2/1965 | Sprague | 204/283 X |
| 3,192,148 | 6/1965 | Chen | 204/301 |
| 3,378,479 | 4/1968 | Colvin et al. | 204/272 X |
| 3,481,857 | 12/1969 | Gray | 204/149 X |
| 3,515,664 | 6/1970 | Johnson et al. | 204/149 X |
| 3,697,410 | 10/1972 | Johnson et al. | 204/301 |
| 3,725,226 | 4/1973 | Stoner | 204/149 |

Primary Examiner—John H. Mack
Assistant Examiner—A. C. Prescott
Attorney, Agent, or Firm—David E. Dougherty; Clayton O. Obenland

[57] ABSTRACT

This invention relates to an electrolytic cell for inactivating and destroying fluid borne pathogenic materials. The cell comprises layers of permeable electrically conductive material separated by layers of permeable electrical insulation. The conductive layers act as the cell electrodes which are connected to a source of alternating current, having a current potential ranging from about 0.1 to about 20 volts with frequencies to about 0.1 to about 10 cycles per second. A suitable filter housing, surrounds the cell and is arranged so that the pathogen containing fluid passes through the permeable electrode layers of the cell. The pathogenic materials are therefore subjected to the electrical potential set up between the layers and are inactivated or destroyed. A cell according to a preferred embodiment of the invention comprises a plurality of layers of conductive and insulative material disposed around a perforated core or tube to thereby form a cylindrical cell body.

6 Claims, 7 Drawing Figures

ELECTROLYTIC CELL FOR INACTIVATION AND DESTRUCTION OF PATHOGENIC MATERIAL

BACKGROUND OF THE INVENTION

Over the past few decades, the needs of increasing population and industrial expansion has brought about a continuing demand for increased supplies of water, both for industrial and for domestic use. Various methods for water treatment have been known, some of these for example, having been developed to control the mineral content of the water for industrial uses such as steam generation or for cooling media. Other methods of water treatment are those relating to water supplied for domestic uses, where the water may be used in food preparation and human consumption. Since impure water may be a major carrier of disease, it is important that domestic water supplies be treated to destroy disease causing or pathogenic organisms. While treatments with chemical agents, such as chlorine or ozone, may accomplish this, the resulting product is not always completely satisfactory. The addition of the chemical agent must be carefully controlled and it may undergo undesirable reactions with trace components dissolved in the water, giving the water an undesirable taste. Additionally, some pathogens are resistant to chemical agents and may require more extended treatment for their removal.

Other methods of pathogen destruction or inactivation include an electrochemical process. For example, U.S. Pat. No. 3,725,276, issued to Stoner, discloses a process for subjecting a pathogen containing aqueous medium to an alternating current which is applied across a pair of electrodes. The pathogens are adsorbed on one of the electrodes, are inactivated and then discharged. This inactivation is contingent on the pathogen coming into contact or close proximity with an electrode, accordingly agitation of the aqueous medium is at least preferred if not necessary, for complete deactivation. While this operation may be carried out fairly effectively on a large scale, some problems have repeatedly arisen when lesser amounts of water are to be treated, for example in small scale systems designed for water treatment in homes or hospitals. Not withstanding the fact that several types of filtration devices have been developed for this type of application which function well for removal of many organic and inorganic impurities, there is still a need for a relatively small filtration unit which will effectively inactivate and/or destroy water borne pathogenic substances. Such a device should be simple in construction, effective over extended periods of use and be capable of installation in standard filtration equipment.

SUMMARY OF THE INVENTION

The invention comprises an electrolytic cell for the destruction of fluid borne pathogenic material, the cell having an inlet and an outlet for the flow of fluid and having at least one pair of closely spaced electrically conductive electrodes. The electrodes are permeable cloth-like material and are so disposed that the fluid penetrates and flows through the electrodes. The electrode materials are separated from each other by an electrical insulating material preferably fluid permeable, and are connected to a source of alternating electric current, so that the pathogenic material contained in the fluid between the electrodes is influenced by an electrical field set up between the oppositely charged electrodes. Contact with the charged electrodes then inactivates and/or destroys the pathogenic material.

DESCRIPTION OF THE PREFERRED EMBODIMENTS

Figure 1:
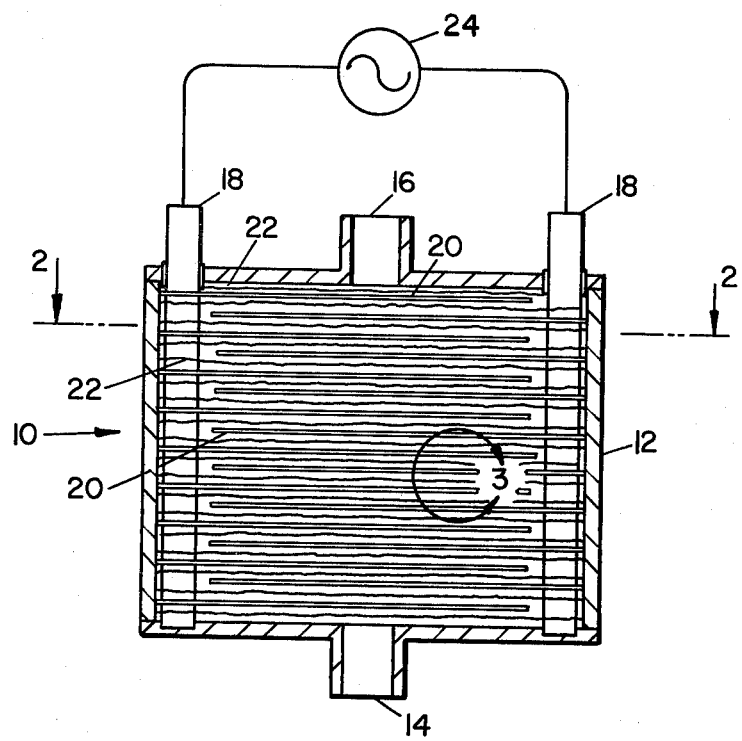
FIG. 1 is a sectional view of a fluid containing housing and shows the electrolytic cell of the invention contained therein.
Figure 2:
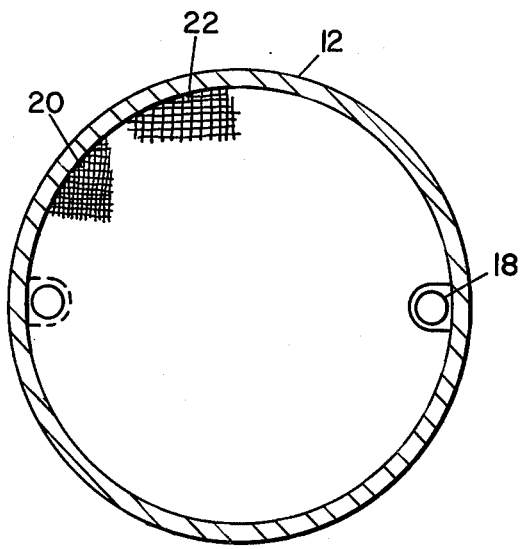
FIG. 2 is a sectional top view of the housing and electrolytic cell.
Figure 3:
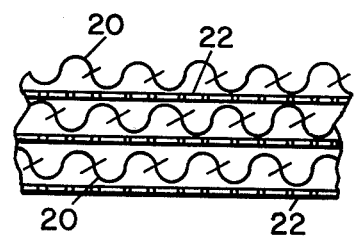
FIG. 3 is an enlarged sectional view of a portion of the electrolytic cell, showing details of electrode arrangement.

An electrolytic cell assembly, generally indicated by the numeral 10, is shown in sectional view in FIG. 1. The cell assembly comprises a fluid tight housing of electrically non-conductive material 12, the housing having an inlet 14 and outlet 16 for the flow of fluid through the housing. An electrolytic cell has two electrode supports 18, disposed within the housing and positioned on opposite sides thereof. Each electrode support 18 holds one or more plate-like electrodes 20. These electrodes comprise fluid permeable conductive material, such as a metallic screen or a metallized polymeric fabric. The electrode material is preferably flexible, such as a graphite or carbon fabric. The electrodes 20 extending from each of the supports 18 are spaced apart from each other and are preferably separated from direct electrical contact by suitable electrical insulation means. The insulation means is preferably fluid permeable and preferably comprises a flexible fibrous material 22 such as a paper or fabric which may be made from fibers of resins such as phenol formaldehyde, polyamide, polyethylene, polypropylene, polyurethane or the like. Alternatively, the insulation means may comprise materials containing inorganic fibers such as those of boron nitride, aluminum silicate or glass. A sectional top view of the cell assembly is shown in FIG. 2, this shows the shaping of the electrodes 20 and the preferred insulation material 22; these are arranged to fit closely against the inner surfaces of the housing 12, thereby causing cell fluid to pass through the permeable plates and insulation instead of passing between the plates and the inner surface of the housing. FIG. 3 shows an enlarged sectional view of a portion of the permeable screen-like electrodes 20 and the preferred permeable insulation 22 separating them within the cell.

During operation, the electrodes 18 are connected to a power source 24. This power source delivers an alternating current which may have a potential ranging from about 0.1 to about 20 volts, a preferred voltage range being about 1 to about 3 volts. The current frequency may be varied from about 0.1 to about 10 cycles per second. As the fluid borne pathogenic material passes through the cell, it is directed through the pairs of oppositely charged electrodes and the pathogens are repeatedly exposed to the action of the alternating opposite electrical charges existing on the closely spaced electrodes. Under these conditions the pathogens are rapidly inactivated and destroyed, the speed of fluid purification depending to a considerable extent on the rate of fluid flow and the pathogen content therein. While the cell is shown as adapted to fit a cylindrical housing, this is for illustration only and the cell assembly may be adapted to fit a square or rectangular housing if desired. Due to the extended area of the conducting electrodes and the dispersive effect of the insulation means between them, no external agitation of the fluid is required to bring about an intimate contact between the pathogenic fluid borne material and the electrodes.

Figure 4:
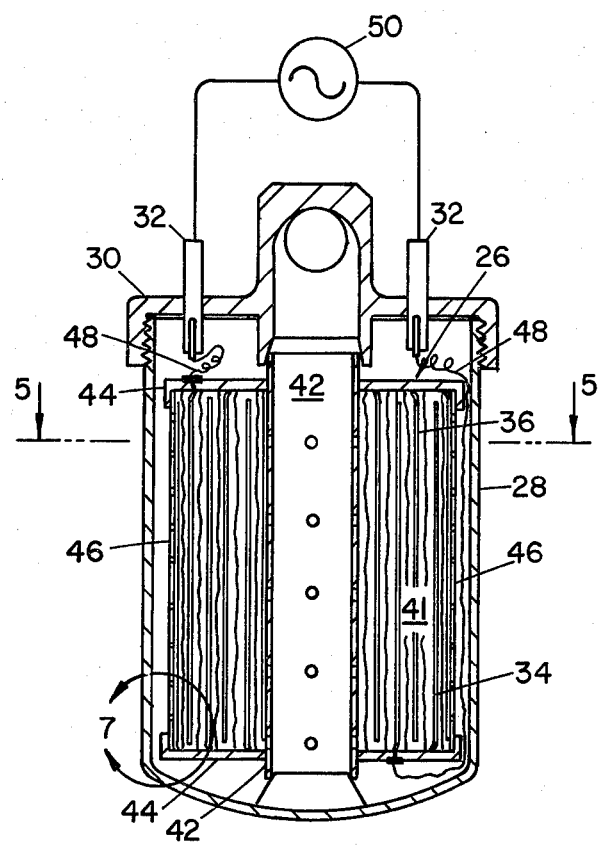
FIG. 4 is a sectional view of a preferred embodiment of the electrolytic cell as contained in a standard water filter housing.
Figure 6:
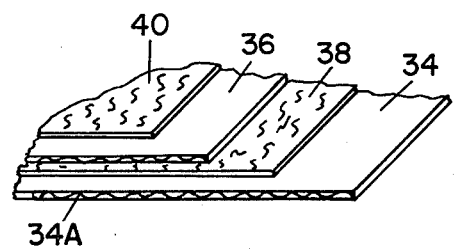
FIG. 6 is an enlarged sectional view of a portion of the electrode arrangement for making the cylindrical electrolytic cell.

Since the cell of the invention is considered to find its primary application in potable water systems, a preferred embodiment of the invention is shown in FIG. 4. In this assembly the cell, shown generally as 26, is contained within a standard cylindrical filter housing 28, the housing having a threaded top which engages with matching threads in a suitable head fixture 30. The head fixture comprises inlet and outlet channels for conducting fluid flow into and out of the housing and provides suitable connections for attachment to the other components of the water treating system. The housing 28 and head fixture 30 are preferably made from an electrically non-conductive material, such as a thermosetting plastic resin. Alternatively, the housing may be a transparent material such as glass; this may be readily detached from the head fixture 30 to permit inspection or removal of the cell 26. The electrodes of the cell are made from two or more long strips or webs of flexible fluid permeable electrically conductive material, such as a screen or fabric, which are laid together with an insulation means between them to form the separated electrode layers. This means preferably comprises one or more strips or webs of flexible fluid permeable flexible insulative material. The conductive strips will become the cell electrodes. This construction is shown in an enlarged view of FIG. 6, where the first strip of conductive material is shown at 34 and a second strip at 36. An enclosed strip of insulative material is shown at 38. It should be noted that strips 34 and 36 are offset laterally so that one edge of the one conductive electrode material 34 extends beyond the adjacent edge of strip 36. This extending edge is shown at 34A. An edge of the other conductive electrode material 36 extends beyond the adjacent edge of strip 34 in a corresponding fashion on the other side of the assembly. Another insulation means, preferably a strip of flexible insulative material 40 is placed upon the conductive material 36 and the composite or combined strips of conductive and insulative material are then wound in a snuggly fitting spiral roll or body 41 around a tubular, perforated core 42. This core is preferably made from an electrically non-conductive material, preferably a thermosetting plastic. The spiral roll 41 is held between two end caps 44, the end caps being fastened to the tubular core 42 by any convenient means, such as press fitting or cementing. The caps 44 must be electrically conductive and are preferably made of a corrosion resistant metal such as brass or stainless steel, or a conductive resin such as a carbon or graphite impregnated polyamide or polyethylene. The conductive material of the caps makes a firm electrically conductive contact with the extended edges of the conductive strip in the spiral roll which is held between the caps, one cap making contact with the extending edges of conductive strip 34A, while the other cap contacts the corresponding extending edges of the conductive strip 36.

Figure 7:
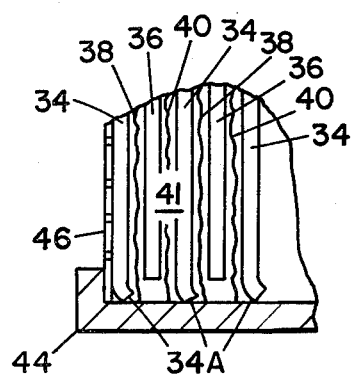
FIG. 7 is an enlarged sectional view of a portion of the cylindrical electrolytic cell.

An enlarged view of a portion of the end cap and electrically conductive strip material is shown in FIG. 7, this illustrates the folded contact of the conductive strip 34A with the inner surface of the conductive end cap 44 when the spiral roll 41 is positioned within the cap. The conductive strip 36 is separated from this end cap but makes contact with the other end cap (not shown) in the same way, both conductive strips then becoming the cell electrodes. Before the end caps are fastened in place, a sheet of relatively rigid non-conductive material 46 is wrapped around the spiral roll 41 to strengthen it and prevent crushing during the assembly of the cell caps. The material 46 is fluid permeable and is preferably a perforated sheet of plastic such as polyamide, polyethylene, polypropylene or the like.

Each of the conductive end caps is provided with an electrical lead wire 48 for connection to the internal ends of the electrical posts 32, the posts being fastened into the head fixture 30 by any suitable means. While the connective means employed for the lead wires 48 is not critical, a preferred means employs tubular jack connections on the internal ends of the posts 32. The lead wires 48 have matching tips on their ends which are easily plugged into the tubular jacks in the posts 32 when the cell 26 is installed within the housing 28.

Figure 5:
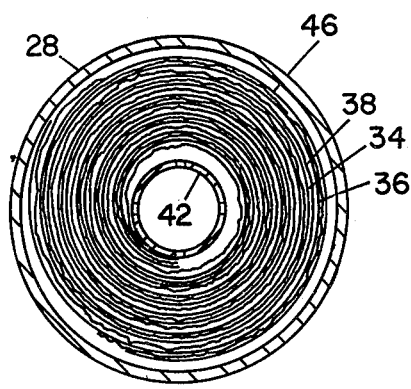
FIG. 5 is a sectional top view of the filter housing and electrolytic cell.

A sectional view of the assembled cell 26, installed in the housing 28, is shown in FIG. 4. A sectional top view of the cell and housing is shown in FIG. 5, this clearly shows the compact spiral configuration of the cell electrodes 34 and 36. A power source of alternating current 50 is connected to the external ends of the electrical posts 32, thus energizing the electrode material within the cell by providing alternating opposite charges upon electrodes 34 and 36. During operation, the pathogen containing fluid flows into the tubular core 42, passing from this through the charged electrodes where the pathogens are inactivated and destroyed. The purified fluid passes into the housing 28 and leaves through an appropriate outlet (not shown). The fluid flow may be reversed if desired. The voltage and frequency of the power source for this cell may be the same as that previously described while the types of fluid permeable conductive and insulative material used in the cell may be the same as those previously recited.

The electrolytic cell 26, when used as a part of a water treatment system, is effective for the treatment of almost any aqueous medium. The cell is effective for the destruction of pathogenic materials in drinking water or well water, for the prevention of slime or algae build up in water systems, for the treatment of sewage effluent after solids removal in primary sewage treatment, and for applications which requires total water recycling wherein the increase of pathogen concentration is detrimental. The cell may be readily installed as a replacement unit in standard filtration equipment and draws a relatively small amount of electrical power to perform its function. The compact construction of the cell causes the pathogenic materials to be brought into intimate contact with the cell electrodes and therefore to undergo maximum exposure to the electrical charges on the electrodes, thus giving the cell a high efficiency for the inactivation and destruction of the pathogens.

I claim:

1. An electrolytic cell for use in apparatus for inactivating and destroying fluid borne pathogenic material, said cell comprising: a tubular perforated core of electrically non-conductive material, a body surrounding said core and including at least two electrode layers of fluid permeable electrically conductive material separated by fluid permeable electrically insulative material, and two end caps of electrically conductive material secured to said core and holding said body therebetween, with one end cap making electrically conductive contact with said one layer and the other end cap making electrically conductive contact with said other layer.

2. The cell of claim 1 wherein said body is a spiral roll wound around said core from a composite of two flexible strips of said conductive material forming said electrode layers, separated by two flexible strips of said insulative material and offset laterally so that the edges of one electrode stip extend beyond the edges of the other electrode strip adjacent one end of said core and the edges of said other electrode strip extend beyond the edges of said one electrode strip adjacent the other end of said core, and said one end cap makes electrically conductive contact with the extending edges of said one electrode strip and said other end cap makes electrically conductive contact with the extending edges of said other electrode strip.

3. The cell of claim 1 in combination with a container including a housing surrounding said cell, an inlet and an outlet for conducting the fluid borne pathogenic material into and out of said housing through said body and core of said cell, and means connected with said end caps for connecting said cell to an electric power source providing alternating opposite electrical charges upon said electrode strips for inactivating and destroying the fluid borne pathogenic material.

4. A method of making an electrolytic cell for use in apparatus for inactivating and destroying fluid borne pathogenic material, said method comprising: providing a tubular perforated core of electrically non-conductive material; surrounding said core with a body including at least two electrode layers of fluid permeable electrically conductive material separated by fluid permeable electrically insulative material; and fastening two end caps of electrically conductive material to said core to hold said body between said end caps with one end cap making electrically conductive contact with one electrode layer and the other end cap making electrically conductive contact with the other electrode layer.

5. The method of claim 4 wherein said body is wound around said core to form a spiral roll from a composite of two flexible strips of said conductive material forming said electrode layers separated by two flexible strips of said insulative material and offset laterally so that the edges of one electrode strip extend beyond the edges of the other electrode strip adjacent one end of said core and the edges of said other electrode strip extend beyond the edges of said one electrode strip adjacent the other end of said core, and said end caps are fastened to said core so that one end cap makes electrically conductive contact with the extending edges of said one electrode strip and said other end cap makes electrically conductive contact with the extending edges of said other electrode strip.

6. The method of claim 4 including arranging said cell within a container including a housing surrounding said cell, an inlet and an outlet for conducting the fluid borne pathogenic material into and out of said housing through said body and core of said cell, and connecting said end caps with means for connecting said cell to an electric power source providing alternating opposite electrical charges upon said electrode layers for inactivating and destroying the fluid borne pathogenic material.

* * * * *